(12) United States Patent
Cao et al.

(10) Patent No.: US 9,301,114 B2
(45) Date of Patent: Mar. 29, 2016

(54) METHOD AND APPARATUS FOR DETERMINING SIGNIFICANT PLACES

(75) Inventors: Huanhuan Cao, Beijing (CN); Jilei Tian, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/376,526

(22) PCT Filed: Feb. 22, 2012

(86) PCT No.: PCT/CN2012/071446
§ 371 (c)(1),
(2), (4) Date: Aug. 4, 2014

(87) PCT Pub. No.: WO2013/123646
PCT Pub. Date: Aug. 29, 2013

(65) Prior Publication Data
US 2015/0005013 A1    Jan. 1, 2015

(51) Int. Cl.
*H04W 64/00* (2009.01)
*H04W 4/18* (2009.01)
*G01S 5/02* (2010.01)
*G06Q 30/02* (2012.01)
*H04W 4/02* (2009.01)

(52) U.S. Cl.
CPC ............... *H04W 4/185* (2013.01); *G01S 5/02* (2013.01); *G06Q 30/0259* (2013.01); *H04W 4/021* (2013.01)

(58) Field of Classification Search
CPC .............................. H04W 64/00; H04W 4/02
USPC ........... 705/14.2, 14.58, 14.63; 455/433, 440, 455/456.3
See application file for complete search history.

(56) References Cited

U.S. PATENT DOCUMENTS

| | | | |
|---|---|---|---|
| 8,788,328 B1* | 7/2014 | George et al. ................ | 705/14.1 |
| 2002/0091019 A1 | 7/2002 | Bays et al. | |
| 2008/0186234 A1 | 8/2008 | Alles et al. | |
| 2010/0304756 A1 | 12/2010 | Yang | |
| 2011/0145228 A1 | 6/2011 | Laurenzo et al. | |

FOREIGN PATENT DOCUMENTS

| | | |
|---|---|---|
| CN | 102162854 | 8/2011 |
| WO | 2010/129094 A1 | 11/2010 |

OTHER PUBLICATIONS

International Search Report received for corresponding Patent Cooperation Treaty Application No. PCT/CN2012/071446 , dated Nov. 22, 2012, 3 pages.

(Continued)

*Primary Examiner* — Kevin Kim
(74) *Attorney, Agent, or Firm* — Ditthavong & Steiner, P.C.

(57) ABSTRACT

An approach is provided for determining significant places with greatly improved accuracy using universally available identifier information. A significant place platform causes, at least in part, a mapping of one or more communication coverage areas associated with one or more identifiers onto at least one geo-grid, wherein the one or more identifiers are associated with at least one device operating within at least one communication network. The significant place platform further processes the one or more identifiers to determine one or more significance scores associated with one or more grid units of the at least one geo-grid. The significant place platform also determines at least one significant place based, at least in part, on the one or more significance scores.

19 Claims, 14 Drawing Sheets

(56) References Cited

OTHER PUBLICATIONS

Meneses et al., "Using GSM Cell ID Positioning for Place Discovering", Pervasive Health Conference and Workshops, Nov. 29-Dec. 1, 2006, 8 Pages.

Isaacman et al., "Identifying Important Places in People's Lives From Cellular Network Data", Proceedings of the 9th international conference on Pervasive computing, 2011, 18 pages.

Laasonen, "Mining Cell Transition Data", Academic Dissertation, Mar. 2009, 158 Pages.

Yu, "Learning Significant User Locations With GPS and GSM", The Thesis, Sep. 2006, pp. 1-59.

Bao et al., "An Unsupervised Approach to Modeling Personalized Contexts of Mobile Users", IEEE 10th International Conference on Data Mining, Dec. 13-17, 2010, pp. 38-47.

Bao et al., "Mining Significant Places From Cell ID Trajectories: A Geo-Gird Based Approach", IEEE 13th International Conference on Mobile Data Management, Jul. 23-26, 2012, 4 Pages.

"Cell Phone Triangulation Accuracy Is All Over the Map", Search Engine Land, Retrieved on Oct. 8, 2014, Webpage available at : http://searchengineland.com/cell-phone-triangulation-accuracy-is-all-over-the-map-14790.

* cited by examiner

METHOD AND APPARATUS FOR DETERMINING SIGNIFICANT PLACES

RELATED APPLICATION

This application was originally filed as PCT Application No. PCT/CN2012/071446 filed Feb. 22, 2012.

BACKGROUND

Service providers and device manufacturers (e.g., wireless, cellular, etc.) are continually challenged to deliver value and convenience to consumers by, for example, providing compelling network services. One such network service is the ability to determine a geographical location of a user based on a device associated with the user. Upon determining a location of a user based on the user's device, personalized information may be provided to the user based on the location. For example, advertisements may be provided to the user's device based on the current location of the device, such that the advertisements are related to goods and services provided around the location. However, the user's current location may not have much significance to the user. By way of example, the user may be on a business trip and may not care for advertisements sent to his phone regarding the location associated with the trip. Alternatively, the user may be away from a significant place during a special event associated with the significant place. Thus, the user may otherwise be unaware of the special event because a notification of the event may not be sent to the user's device when the current location of the device is not associated with the significant place. What the user may find of more importance is being provided with location-based or location-derived information associated with significant places of the user. Accordingly, service providers and device manufacturers face significant problems in determining the significant places associated with a user in a way that is universally available.

Some Example Embodiments

Therefore, there is a need for an approach for determining significant places.

According to one embodiment, a method comprises causing, at least in part, a mapping of one or more communication coverage areas associated with one or more identifiers onto at least one geo-grid, wherein the one or more identifiers are associated with at least one device operating within at least one communication network. The method also comprises processing the one or more identifiers to determine one or more significance scores associated with one or more grid units of the at least one geo-grid. The method further comprises determining at least one significant place based, at least in part, on the one or more significance scores.

According to another embodiment, an apparatus comprises at least one processor, and at least one memory including computer program code for one or more computer programs, the at least one memory and the computer program code configured to, with the at least one processor, cause, at least in part, the apparatus to map one or more communication coverage areas associated with one or more identifiers onto at least one geo-grid, wherein the one or more identifiers are associated with at least one device operating within at least one communication network. The apparatus is also caused to process the one or more identifiers to determine one or more significance scores associated with one or more grid units of the at least one geo-grid. The apparatus is further caused to determine at least one significant place based, at least in part, on the one or more significance scores.

According to another embodiment, a computer-readable storage medium carries one or more sequences of one or more instructions which, when executed by one or more processors, cause, at least in part, an apparatus to map one or more communication coverage areas associated with one or more identifiers onto at least one geo-grid, wherein the one or more identifiers are associated with at least one device operating within at least one communication network. The apparatus is also caused to process the one or more identifiers to determine one or more significance scores associated with one or more grid units of the at least one geo-grid. The apparatus is further caused to determine at least one significant place based, at least in part, on the one or more significance scores.

According to another embodiment, an apparatus comprises means for causing, at least in part, a mapping of one or more communication coverage areas associated with one or more identifiers onto at least one geo-grid, wherein the one or more identifiers are associated with at least one device operating within at least one communication network. The apparatus also comprises means for processing the one or more identifiers to determine one or more significance scores associated with one or more grid units of the at least one geo-grid. The apparatus further comprises means for determining at least one significant place based, at least in part, on the one or more significance scores.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 36-38.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining significant places are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term identifier refers to an identifier/ identification associated with a connection point to one or more communication networks. The connection point can be any type of entry point, access point, endpoint, etc. that provides a connection to the communication network, such as a base station, a cell tower site, a wireless access point, a radio transmitter/receiver, etc. Although various embodiments are described with respect to base station identifiers and base stations, it is contemplated that the approach described herein may be used with any type of identifier associated with any type of connection point.

Figure 1:
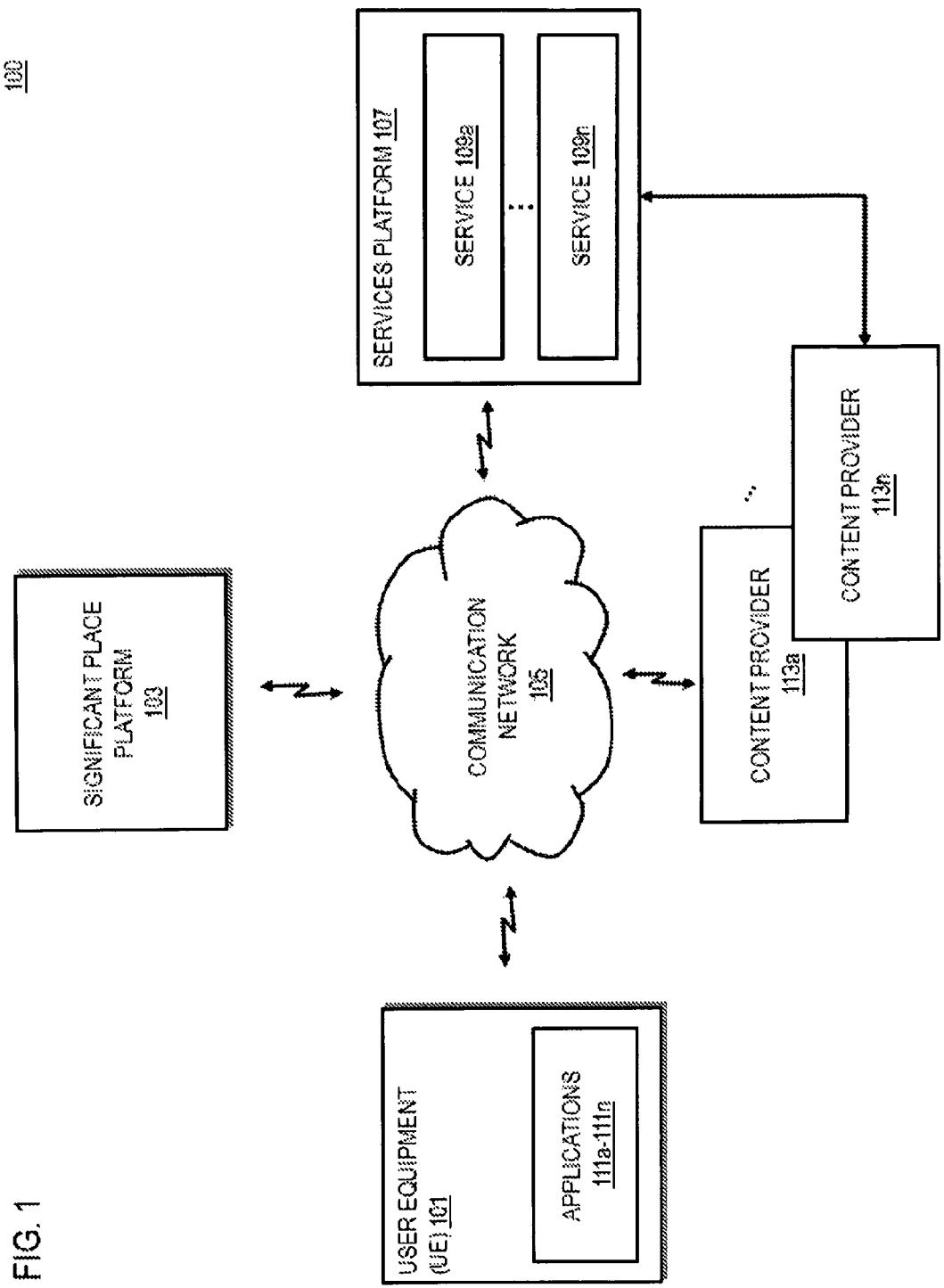
FIG. 1 is a diagram of a system capable of determining significant places, according to one embodiment.

FIG. 1 is a diagram of a system capable of determining significant places, according to one embodiment. As discussed above, most location-based services focus on the current location of a user. For example, a service may provide advertisements to a user via the user's mobile device. To provide a more personalized experience, the service may determine and/or receive information regarding the current location of the user and provide advertisements that are specific to the location of the user. This allows the user to browse advertisements that the user may be interested in based merely on the user's current location. However, the user's current location may not have much significance to the user. For example, the user may be traveling for work and be located within a city for one afternoon. A service provider may provide the user information regarding services and/or goods associated with the city based on a detection of the user currently located in the city. However, the user may find such information of little use because the user is only in the city for a short duration of time. What the user may find of more value are location-based services that consider locations that have more significance to the user rather than, for example, merely the current location of the user. By way of example, by considering significant places associated with a user, the location-based services may plan ahead and provide the user with services and/or goods that occur in the future based on the significant places.

Further, location-based services have become more and more popular with the rapid popularization of smart mobile devices. However, current location-based services rely on GPS systems, triangulation using base station identifier signals, and/or clustering methods. With GPS systems, devices must include hardware and/or resources that are able to communicate with the GPS systems. For certain devices, particularly low-end devices, the devices may not include the hardware and/or resources necessary to enable communication with GPS systems. With respect to triangulation, for example triangulation of GSM signals, triangulation requires a close relationship with the service provider of the network of base stations because, for example, the triangulation entails the installation of hardware and software within the service provider's network to allow for the detection of signals to support the triangulation. The close relationship between the service provider of the network and the device manufacturer and/or location service provider often do not exist such that the location service provider is unable to use triangulation of signals as a method for determining location. Further, with respect to clustering methods, clustering methods do not have fine location detection capabilities. Thus, although a general area may be determined as the user's location, the size of the general area often leaves the information regarding the location of little use.

To address these problems a system 100 of FIG. 1 introduces the capability to determine significant places according to a geo-grid-based approach from one or more base station identifier trajectories. The system 100 introduces the capability to determine stay areas where a user tends to stay and map the stay areas to a geo-grid composed of multiple grid units. The system 100 may then mine significant places from the geo-grid by considering the significance of the grid units. The significance of the grid units may be determined based on, for example, the frequency a user visits a stay area associated with the grid units. Based on the significance of the grid units, the system 100 determines significant places associated with a user and may then use the significant places to provide more personalized location-based services to the user. By providing location-based services according to significant places associated with the user rather than, for example, merely according to the current location of the user, the system 100 introduces the capability to provide highly significant location-based information to the user to provide a more meaningful experience.

The system 100 may gather information associated with universally available base station identifiers that devices may communicate with that may be stored in logs within the devices. The base station identifiers are universally available because all devices that communicate with base stations are able to determine the base station identifiers without additional hardware and/or additional resources. Importantly, because no additional resources are needed to determine the base station identifiers, the identifiers provide an energy efficient solution to determine significant places at high levels of accuracy. For example, the devices may store logs of base station trajectories that record the base station identifiers serving the device for a predefined time interval. The base stations may be, for example; a cellular tower or any hardware that allows a device to communicate with a network. Such logs are common to all mobile devices such that no additional agreement between the service provider and device manufacturer is needed to log the information. Further, compared with GPS information, base station trajectories are more easily collected because the power consumption of recording the identifiers of serving base stations is trivial. Thus, no additional hardware and/or resources are required, which allows the process to be implemented on low-end devices without GPS sensors.

The geo-grid may consist of a geo-graphical area of any size (e.g., city, county, state, country, continent, etc.) that is divided into grid units. The grid units may be of any size and shape. For example, a grid unit may comprise approximately a square that is bounded by longitude and latitude. The size of the grid unit is determined such that an individual grid unit is smaller than the area covered by a single base station. For example, the coverage area of a base station signal may be thought of in terms of a circle, where the base station is at the center of the circle and the radius of the circle is the range of the signal of the base station. In one embodiment, where the range of the signal of the base station may be several miles, the size of the grid units may be approximately 50-100 meters. In one embodiment, the size of the grid units may be 0.001 latitude by 0.001 longitude. However, the size of the grid units may be any size based on factors such as, for example, the computational power of the system 100, such that the higher the computational power, the smaller the grid units (since smaller grid units result in more grid units), and the number of base stations that cover a single area, such that the more base stations the smaller the grid units. In one embodiment, the consideration of the size of the grid unit may take into account two factors. According to one factor, when the scale of the grid unit is large, one grid unit may contain several significant places. According to another factor, when the scale of the grid unit is small, several adjacent significant grid units may imply the same significant place. Thus, the size of the grid unit may be determined such that more than one significant place is not contained in a single grid unit and such that one significant place does not appear as being in two different grid units.

In one embodiment, the system 100 may mine for significant places associated with a user by extracting stay areas of the user. A stay area may be an area where a user has stayed that may be determined based on the universally available base station trajectories stored within the user's device. The system 100 may then leverage the coverage areas of base stations and map the stay areas onto the geo-grid according to the grid units that are covered by the coverage areas. Each grid unit that lies within a stay area may then represent a candidate significant place. The system 100 may further calculate the significance of the grid units and separate the areas that consist of many grid units by removing the grid units with low significance. The system 100 may then determine the areas that are smaller than a predefined threshold area as a significant place.

The system 100 may extract stay areas by determining segments of base stations whose coverage areas may contain a stay point from the base station trajectory of a mobile user. Such segments of base stations may be referred to as, for example, stay sessions. The resulting segment of base stations then corresponds to several coverage areas of the base stations. The overlapped coverage area of all base stations in a stay session results in a stay area. In one embodiment, a stay session may be composed on a single base station that is identified repeatedly within the log of base station identifiers. For example, if the sampling rate of a base station that a mobile device is in communication with is every minute, and the user does not change their location for an hour, the same base station may be identified within the log for the entire hour. Such may be the case where there are no other base stations in the area associated with the user. In one embodiment, the user may similarly not change their location for an hour and the sampling rate may be every minute. However, if there are several base stations that are within the same area, the user's device may be in communication with several base stations over the course of the hour—particularly if the user is at the boundaries of coverage areas of several base stations. However, the system 100 may determine that both cases correspond to a stay session because, for example, the user has stayed in a general area for the entire period of time.

In one embodiment, the system 100 may determine a stay session by determining a closed base station trajectory segment. Specifically, given a base station trajectory $C=c_1c_2 \ldots c_n$, where $c_i$ ($1 \leq i \leq n$) denotes a base station, for a segment of C denoted as $s=c_jc_{j+1} \ldots c_{j+k}$ ($1 \leq j \leq n-k$), s is considered a closed base station segment of C if $\forall_{j \leq a, b \leq (j+k)} c_a.A \cap c_b.A \neq \phi$, where c.A denotes the coverage area of the base station c. Further, given a threshold of minimum time range $T_{min}$, for a closed base station segment $s=c_ic_{i+1} \ldots c_{i+n}$, s is a stay session if (a) $(c_{i+n}.\text{timestamp} - c_{i+1}.\text{timestamp}) \leq T_{min}$ and (b) $\not\exists_{s'} (s \subset s') \land$ (s' is a closed segment of C). Based on the foregoing, the system 100 may determine a stay session from which to perform further analysis to determine significant places.

In one embodiment, the system 100 may further determine stay areas from the determined stay sessions. For example, given a stay session $s=c_ic_{i+1} \ldots c_{i+n}$, a stay area of a user may be defined as $A_s = \cap_{c \in s} c.A$, where c.A indicates the coverage area of the base station c. The coverage area of each base station may be composed of many grid units by enumerating the grid units whose centers are covered by coverage area c.A. The overlapped area formed by overlapped coverage areas may be calculated by enumerating the joining grid units among the overlapped areas. The result is a stay area composed of many grid units.

In one embodiment, the system 100 may determine the visiting frequency of every grid within a geographical area rather than relying on determining a stay sessions and/or a stay area. Such an embodiment may occur where, for example, the computational power of the system is large enough to handle to extra processing power. However, with the determined stay areas, the significant places of the user may be determined based on the stay areas. Generally, the system 100 may determine the visiting frequency of each grid unit in the stay areas and take the top most frequently visited grid units as significant places. Specifically, in one embodiment, a grid unit may be visited once when it appears in one stay area. However, in one embodiment, a grid unit may be determined as being visited once when a base station identifier is included in the log whose coverage area covers the center of the grid unit. In one embodiment, the system 100 further takes into account the different accuracy of estimating stay points for each stay area. For example, the larger the stay area, the more inaccurate the estimation of a real stay point. Thus, in one embodiment, the system 100 places more weight on smaller stay areas. Further, the longer the time range of a stay session, the more likely the stay session includes a significant place. Thus, in one embodiment, the system 100 places more weight on stay areas associated with stay sessions of longer periods of time. Accordingly, in one embodiment, the system 100 determines the significance scores of the grid units according to equation (1):

$$\text{Significance}(g) = \sum_{s: g \in s.A} \frac{TimeRange(s)}{GridNum(s \cdot A)} \quad (1)$$

where s denotes a stay session, s.A denotes the corresponding stay area, and GridNum(s.A) indicates the number of grid units s.A contains. According to equation (1), the significance scores of grid units may be determined based on multiple stay areas that are composed of the grid units and the number of grid units and time range associated with the stay areas may be used to further refine the significance scores. Further, according to equation (1), the more time a user spends at a significant place, the better the accuracy can be achieved. Specifically, the more time a user spends at a significant place, the more information collected regarding the significant place, which translates into more information regarding stay sessions and/or stay areas. Further, the more information regarding stay sessions and/or stay areas, the more information the system 100 is provided to perform the analysis of the various stay areas and determine the significance scores of the related grid units to determine the significant places.

In one embodiment, upon determining the significance scores, the system 100 determines the significant places based on the significance scores. In one embodiment, the system 100 may determine a maximum area threshold as $A_{max}$ to limit areas of significant places. For each of the stay areas determined based on the stay sessions, the system 100 may recursively remove the grid units with the lower significance scores in the stay areas to split the original stay areas. The grid units with the lower significance scores may be removed until, for example, the size of the stay areas are below the threshold max area $A_{max}$. In one embodiment, the system 100 may perform the recursive pruning of grid units according to the following algorithm:

---
Algorithm 1 Significant Places Extraction
---
Input 1: a set of areas Λ = {A};
Input 2: a maximum area threshold Amax,
Output: a set of significant places P;
  1: P ← ø,
  2: for each A ∈ Λ do
  3:   if Are(A) > Amaxthen
  4:     call Separat(Λ,Amax, P);
  5: else
  6:   P ← P ∪ A;
  7: return P;
Method Separate(Λ',A'max, P)
  1: for each A' ∈ Λ' do
  2:   if Are(A') > Amaxthen
  3:   gmin ←argmin(Signicance(g)), where g ∈ A';
  4:   for each g ∈ A' do
  5:     if Signicanc(g) ≤ Signicance(gmin) then
  6:       A' ← A' – g;
  7:     if A' is split to several areas Λ * = {A*} then
  8:       call Separat(Λ *,Amax; P);
  9:     else
10:      go to 3;
11:  else
12:    P ← P ∪ A';
13: return;

--- where A denotes an area that consists of many grid units, the method Separate (Λ', $A'_{max}$, P) is a recursive function for separating areas Λ' and inserting the areas that are small enough as compared to the threshold area $A_{max}$ to define a set of significant places.

In one embodiment, the system 100 allows for the decay of significance scores for one or more grid units based on a passing of time since the last time the grid unit was within a stay area. By way of example, a grid unit may be determined as being associated with a significant place but, over time, the significance associated with the grid unit may change, such as when then significant places associated with a user change. Thus, as the significance score of a grid unit is incremented as the grid unit is associated with a stay area, the significance score is decremented after set intervals of time since the last time the significance score was incremented. Accordingly, the system 100 allows for the significant places associated with a user to change over time. For instance, a user's home may be determined as a significant place based on the amount of time the user is at home. However, the user's home may change over time (e.g., when the user moves from one house to another house). The old significant place may be faded out as the new significant place associated with the new house becomes visited frequently. In one embodiment, the significance scores associated with the one or more grids of the old significant place associated with the old house will decay in significance over time to allow for the determination of the new significant place associated with the new house.

In one embodiment, the system 100 may determine significant places based on base stations from one or more networks, such as from two different networks. By way of example, as mobile devices become more advanced, a single device may include more than one SIM card. Each SIM card may configure the device to be operable on a different network. Accordingly, the system 100 may use the base stations associated with any combination of the base stations, such as all of the base stations among different networks. In such an embodiment, a single mobile device may get twice the base station information for a specific geographic area because multiple network service providers usually have overlapping coverage areas associated with different base stations.

In one embodiment, the system 100 may factor other contextual information into determining the significance scores associated with the grid units. For example, the system 100 may include information associated with known points of interests based on historical information associated with other users or based on historical information provided by other services. In which case, the system 100 may provide higher significance scores to grid units that are determined to be within stay areas of a user that also correspond to known points of interest. For example, a grid unit may be associated with a large shopping mall that attracts a large number of users. If the system 100 determines a stay area associated with the grid unit, the system 100 may determine a significance score associated with the grid unit that is higher than other adjacent grid units based on the known point of interest associated with the grid unit.

As shown in FIG. 1, the system 100 comprises a user equipment (UE) 101 having connectivity to significant place platform 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, near field communication (NFC), Internet Protocol (IP) data casting, digital radio/television broadcasting, satellite, mobile ad-hoc network (MANET), and the like, or any combination thereof.

The UE 101 is any type of mobile terminal, fixed terminal, or portable terminal including a mobile handset, station, unit, device, mobile communication device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The UE 101 may execute one or more applications 111a-111n (collectively referred to as applications 111). The applications 111 may be any type of application, such as one or more social networking applications, one or more navigational applications, one or more calendar applications, one or more browsing applications (e.g., Internet browser), etc., or a combination thereof. In one embodiment, one or more applications 111 may perform any one or more of the functions of the significant place platform 103 discussed below.

The system 100 may also include a services platform 107 that includes one or more services 109a-109n (collectively referred to as services 109). The services 109 may be any type of service, such as one or more social networking services, one or more navigational services, one or more calendar services, etc., or a combination thereof. In one embodiment, one or more services 109 may perform any one or more of the functions of the significant place platform 103. In one embodiment, the significant place platform 103 may provide information pertaining to one or more significant places associated with a user to one or more of the services 109 so that the services 109 may provide personalized services associated with the significant places to the user.

The system 100 may also include one or more content providers 113a-113n (collectively referred to as content providers 113). The content providers 113 may provide any type of content, such as content related to social networking services, one or more navigational services, one or more calendar services, etc., or a combination thereof. In one embodiment, the significant place platform 103 may provide information pertaining to one or more significant places associated with a user to one or more of the content providers 113 so that the content providers 113 may provide personalized content associated with the significant places to the user.

By way of example, the UE 101, the significant place platform 103, the services platform 107 and the content provider 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
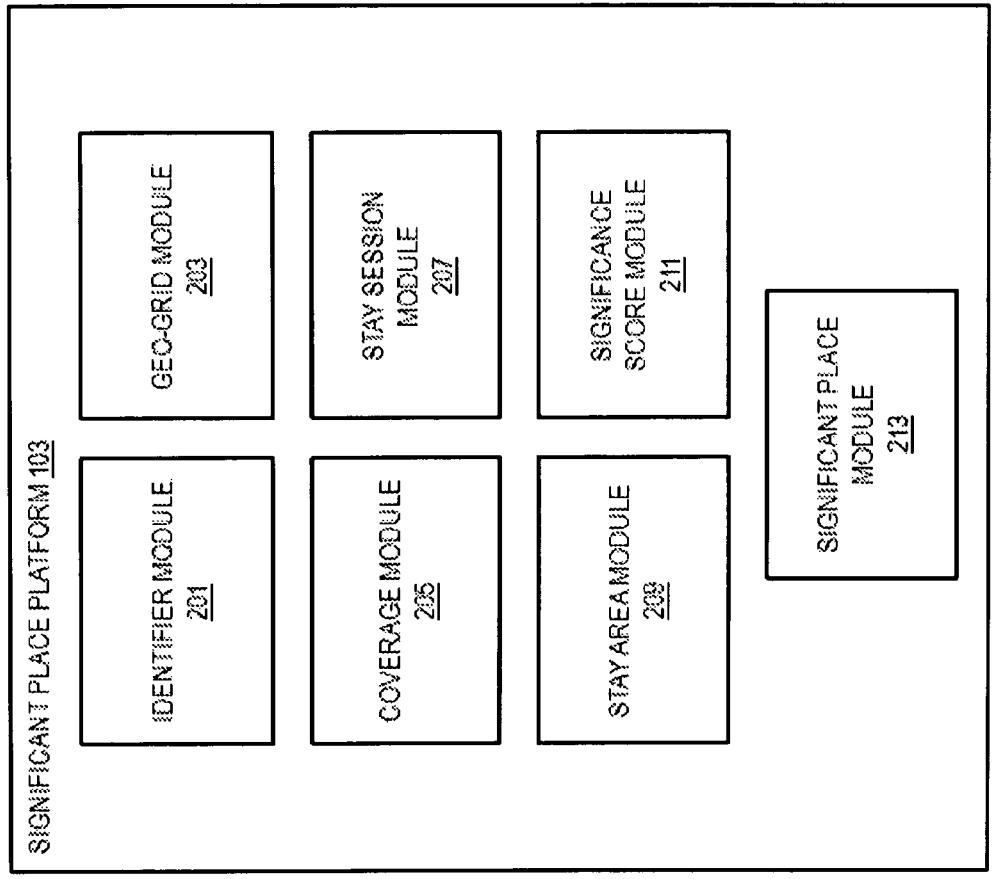
FIG. 2 is a diagram of the components of a significant place platform, according to one embodiment.

FIG. 2 is a diagram of the components of a significant place platform 103, according to one embodiment. By way of example, the significant place platform 103 includes one or more components for determining significant places. It is contemplated that the functions of these components may be combined in one or more components or performed by other components of equivalent functionality. For example, one or more functions of these components may be performed by any one or more of the UE 101, applications 111 on the UE 101, services 109, and/or content providers 113. In this embodiment, the significant place platform 103 includes an identifier module 201, a geo-grid module 203, a coverage module 205, a stay session module 207, a stay area module 209, a significance score module 211, and a significant place module 213.

The identifier module 201 interfaces with the UE 101 to determine the logs of base stations that the UE 101 may have communicated with to determine the base station identifiers to process for determining the significant places. The base station logs may include the base station identifier and a time that the UE 101 communicated with the base station. Optionally, the base station logs may include additional information, such as the service provider that is associated with the base station. Using the log information, the identifier module 201 determines a base station trajectory that indicates the base stations that communicated with the UE 101 in a linear progression based on time.

The geo-grid module 203 divides one or more geographical areas into grid units. In one embodiment, the geo-grid module 203 may divide a geographical area into grid units of one size. In one embodiment, the geo-grid module 203 may divide a geographical area into grid units of multiple different sizes. In such an embodiment, the size of grid unit that is used to determine the significant place may be determined based on, for example, the computational power of the hardware that is processing the base station identifiers to determine the significant places. By way of example, the size of the grid units may be approximately 50-100 meters. In one embodiment, the size of the grid units may be 0.001 longitude by 0.001 latitude.

The coverage module 205 determines the coverage of the base stations identified by the identifier module 201 with respect to the geographic area covered by the base stations. In one embodiment, the coverage module 205 may already include information from the network service providers that indicates the coverage areas of the individual base stations for a particular network. In one embodiment, the coverage module 205 may access one or more services 109 and/or one or more content providers 113 to determine the coverage areas of the various base stations. Once the coverage module 205 determines the coverage areas of the various base stations that may be determined from logs of the UE 101, the coverage module 205 interfaces with the geo-grid module 203 to determine the various grid units that are covered by the base stations that have communicated with the UE 101 based on the communication logs.

The stay session module 207 determines the stay sessions associated with the base station trajectories acquired by the identifier module 201. In one embodiment, the stay session module 207 determines the closed base station segments associated with the base station trajectory and determines the stay sessions based on the base station segments. In this way, the stay session module may determine the base stations that may be noise because, for example, they may have communicated with the UE 101 while the UE 101 was traveling from one stay area to another stay area. By way of example, between stay points A and B, a UE 101 may communicate with five base stations. However, these base stations merely represent the UE 101 maintaining a connection to the network while the user is traveling and are not necessarily associated with a significant place. By determining the closed base station segments and stay sessions, the significant place platform 103 may weed out insignificant base stations that would otherwise only add to the information processing load without adding to the detection of significant places.

The stay area module 209 determines the stay areas from the stay sessions. Based on the detection of the stay sessions, the stay area module 209 interfaces with the identifier module 201, the geo-grid module 203, the coverage module 205 and the stay session module 207 to determine the grid units that are associated with the base stations that are associated with the stay sessions according to the coverage areas of the base stations. Where the coverage areas of more than one base station overlap, the stay area module 209 determines the stay area based on the grid units whose centers lie within the overlapping areas. Where, for example, a stay session is not associated with overlapping coverage areas from multiple base stations, such as when a stay session is associated with only one base station, all of the grid units whose centers lie within the coverage area of the single base station may be considered as part of a stay area.

The significance score module 211 determines the significance scores associated with the grid units that are part of stay areas. In one embodiment, when a grid unit is associated with a stay area, the grid unit's significance score is incremented by one unit. Thus, for example, a grid unit that lies within five different stay areas determined based on five different stay sessions may have a significance score of 5. In one embodiment, the significance score of a grid that lies within a stay area is further affected by the number of grid units that lie within the stay area, the length of time associated with the stay area according to the stay session, or a combination thereof. In one embodiment, the larger the number of grid units that are associated with a stay area, the lower the significance score is incremented for the grid units. For example, if a stay area is large (e.g., 100 grid units), only one of the grid units may be associated with a significant place. Thus, the accuracy of the stay area may not be high and the significance that any one of the grid units is within the stay area is not high. However, if a stay area is small (e.g., 10 grid units), although only one of the grid units may be associated with a significant place, the accuracy of the stay area is higher because only nine of the grid units may not be associated with a significant place, rather than 99.

With respect to the length of time associated with the stay area, the longer the length of time associated with the stay session and stay area, the higher the significance score associated with the grid units within the stay area. For example, if a user stays within a stay area for an extended period of time, there is a higher probability that the stay area is associated with a significant place within the stay area. Therefore, a greater significance may be placed on the grid units according to the time associated with the stay sessions.

In one embodiment, the significance score module 211 also decrements the significance scores associated with the grid units based on one or more periods of time that have elapsed since the grid units were within a stay area. A significant place will generally be visited routinely over a period of time. Accordingly, a grid unit associated with a significant place will naturally have its significance score increase over time. If the user stops visiting the significant place, the significance score will become lower than other grid units that are visited. However, the significance score associated with the grid unit may also be decremented according to various amounts over various threshold periods of time. For example, if the grid unit is not within a stay area that is at most one week old, the significance score associated with the grid unit may be decremented one unit. Further, for example, if the grid unit is at most two weeks old, the significance score associated with the grid unit may be decremented two units, and so on until the significance score is zero or until the user again visits a significant place associated with the grid unit such that the grid unit is again associated with a stay area.

The significant place module 213 determines the significant places associated with a user based on the significance scores associated with the grid units. As discussed above, the significant place module 213 may use one or more algorithms to narrow down the grid units that are associated with a significant place. In one embodiment, the significant place module 213 collects the stay areas and associated grid units. The significant place module 213 may then determine a maximum area threshold associated with an area that will be determined a significant place. The significant place module 213 may then recursively remove the grid units within the stay areas according to the significance scores, with the grid units with the lower significance scores being removed first, until the stay areas and the associated grid units are smaller than the maximum area threshold. The significant place module 213 may then determine that the remaining grid units within the remaining stay areas represent significant places for the users associated with the UE 101 from which the base station identifier logs originated.

Figure 3:
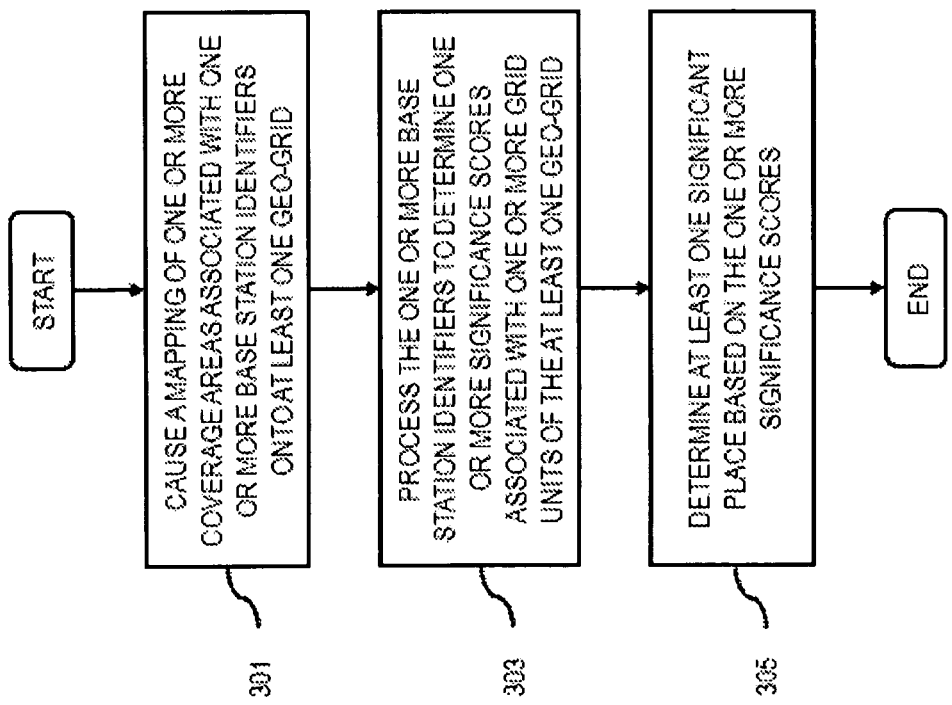
FIG. 3 is a flowchart of a process for determining significant places, according to one embodiment.
Figure 13:
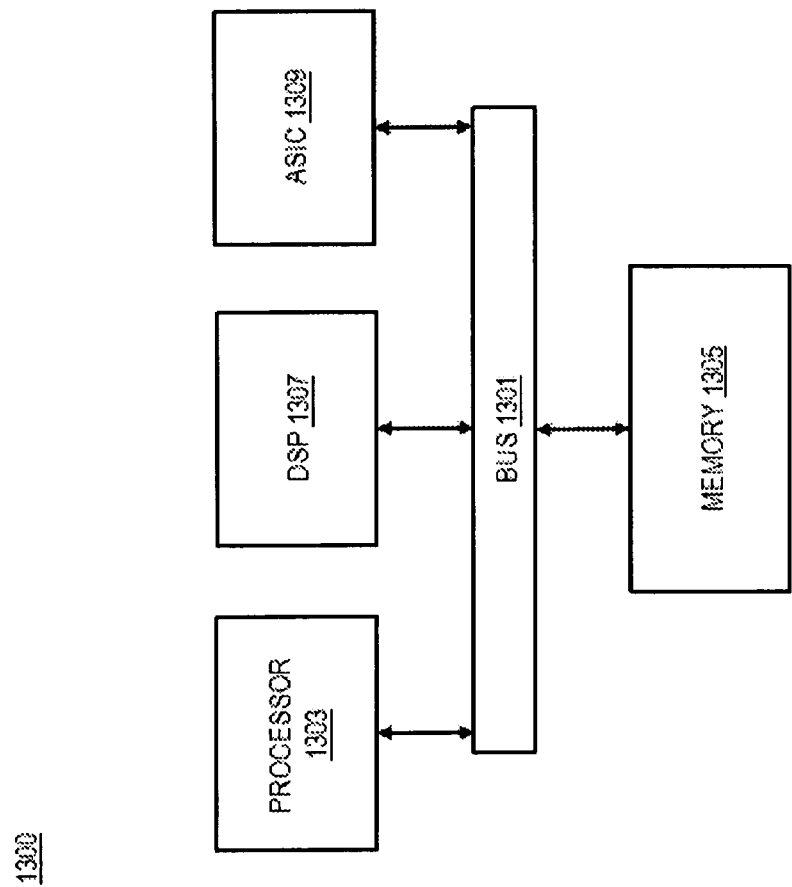
FIG. 13 is a diagram of a chip set that can be used to implement an embodiment of the invention.

FIG. 3 is a flowchart of a process for determining significant places, according to one embodiment. In one embodiment, the significant place platform 103 performs the process 300 and is implemented in, for instance, a chip set including a processor and a memory as shown in FIG. 13. In step 301, the significant place platform 103 causes, at least in part, a mapping of one or more coverage areas associated with one or more base station identifiers onto at least one geo-grid, the base station identifiers being associated with at least one device operating within at least one communication network. For example, the one or more base station identifiers may be associated with one or more cellular towers that are part of a GSM network that communicate with a cellular device. The significant place platform 103 may map the coverage areas of the one or more base stations onto a geo-grid composed of many grid units. The one or more base station identifiers may be determined based on a log within a UE 101 of the base stations that the UE 101 has communicated with as part of the GSM network. For example, as a device communicates with a cellular tower, the device may record information pertaining to, for example, the cellular tower identifier and the time the device communicated with the tower.

In step 303, the significant place platform 103 processes the one or more base station identifiers to determine one or more significance scores associated with the one or more grid units of the at least one geo-grid. In one embodiment, the significance score of a grid unit may correspond to the number of times the grid unit is included within a stay area as determined by the significant place platform 103. Thus, for example, for each stay area a grid unit is associated with, the significance score may increase by one unit. In one embodiment, the significance score of a grid unit may correspond to the number of times a base station identifier that includes a coverage area that includes the grid unit is included within the log of the UE 101. Thus, for example, in such an embodiment, each time the UE 101 logs the base station identifier in the log, the significance score associated with all grid units associated with the coverage area of the base station increase by one unit.

In step 305, the significant place platform 103 determines at least one significant place based, at least in part, on the one or more significance scores. In one embodiment, the significant place platform 103 may determine significant places based on all grid units that have a significance score above a set threshold. In one embodiment, the significant place platform 103 may determine significant places based on all grid units that are associated with a stay area after recursively removing grid units of lower significance scores from the stay areas until the stay areas are within a threshold area. Accordingly, the significant place platform 103 may determine significant places associated with a user according to the base stations that a UE 101 communicates with and forward the information pertaining to the significant places to the other services providers to provide, for example, location-based services based on the significant places to the user. Thus, the significant places may be determined by leveraging universally available and energy efficient base station identifier information from mobile devices while still maintaining a high level of accuracy. Further, the more time a user spends at significant place, the better accuracy can be achieved as the more information can be collected and processed to determine not only the significance of the place but also narrow down the location of the place.

Figure 4:
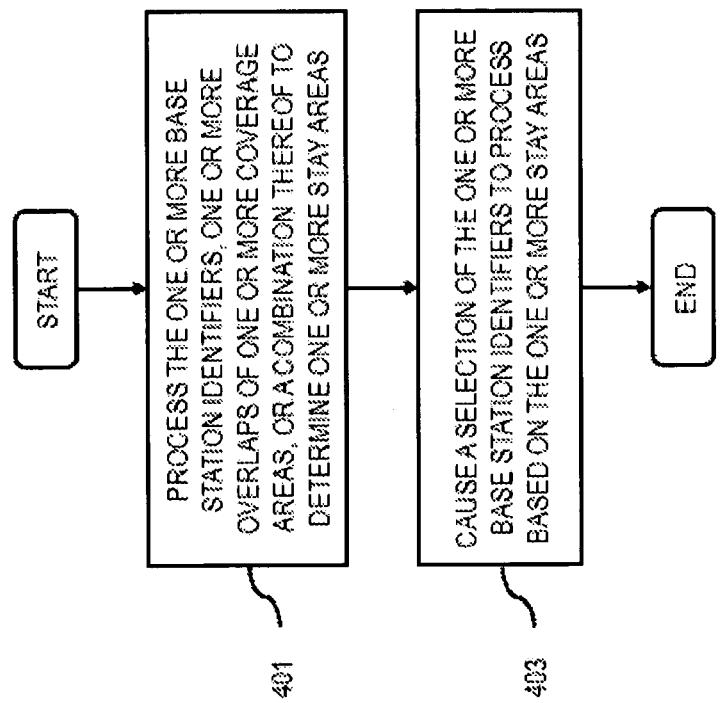
FIG. 4 is a flowchart of a process for determining one or more stay areas, according to one embodiment.

FIG. 4 is a flowchart of a process for determining one or more stay areas, according to one embodiment. In one embodiment, the significant place platform 103 performs the process 400 and is implemented in, for instance, a chip set including a processor and a memory as shown in FIG. 13. In step 401, the significant place platform 103 processes the one or more base station identifiers discussed in the process 300 above, one or more overlaps of one or more coverage areas associated with the one or more coverage areas associated with the base stations, or a combination thereof to determine one or more stay areas. As discussed above, a stay area may be an area that the user has stayed in for a period of time. The stay area may be associated with one base station identifier where, for example, during the period of time the UE 101 associated with the user communicated with only one base station (e.g., where the user is in the center of a coverage area of a base station, or where no other base stations are near the UE 101). In such an example, the stay area may be associated with the coverage area of the base station. The stay area may also be associated with more than one base station identifier where, for example, during the period of time the UE 101 associated with the user communicated with more than one base station (e.g., where the user is near the boundary of multiple base stations, or where there are a large number of base stations and signal strength variations permit the UE 101 to communicate with multiple base stations). In such an example, the stay area may be associated with the overlapping coverage areas of the multiple base stations.

In step 403, the significant place platform 103 causes, at least in part, a selection of the one or more base station identifiers to process in process 300 based, at least in part, on the one or more stay areas. Accordingly, the one or more base stations that are associated with the stay areas based on the coverage areas of the base stations are selected to be processed to determine the significance scores associated with the grid units within the stay areas and ultimately to determine the at least one significant place.

Figure 5:
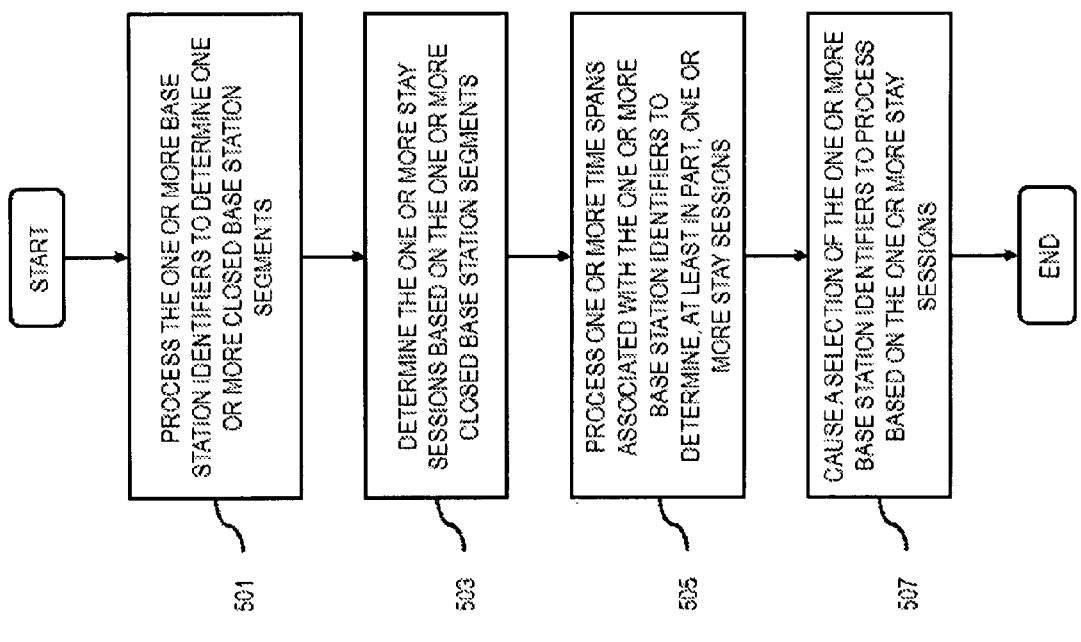
FIG. 5 is a flowchart of a process for determining one or more stay sessions, according to one embodiment.

FIG. 5 is a flowchart of a process for determining one or more stay sessions, according to one embodiment. In one embodiment, the significant place platform 103 performs the process 500 and is implemented in, for instance, a chip set including a processor and a memory as shown in FIG. 13. In step 501, the significant place platform 103 processes the one or more selected base station identifiers to determine one or more closed based station segments. A closed base station segment may be determined based on, for example, a repeated base station identifier within the base station identifier log. Upon a subsequent base station identifier being determined that corresponds with a coverage area that does not overlap with the coverage area of the repeated base station identifier, the base station segment may become closed such that the segment includes only the repeated base station identifier. A closed base station segmented may also be determined based on, for example, multiple base station identifiers that correspond to base stations whose coverage areas overlap. Upon a subsequent base station identifier being determined that corresponds with a coverage area that does not overlap with the coverage area of the multiple base station identifiers, the base station segment may become closed such that the segment includes only the multiple base station identifiers whose coverage areas overlap. In step 503, the significant place platform 103 determines one or more stay sessions based, at least in part, on the one or more closed base station segments.

In one embodiment, in step 505, the significant place platform 103 processes one or more time spans associated with the one or more base station identifiers to determine, at least in part, one or more stay sessions. As discussed above, in one embodiment, the stay sessions may also be determined based on base station segments being associated with a time period that is greater than a set minimum threshold time period. For example, a short period of time may always have only one repeated base station identifier. Thus, such an indication of a repeated base station identifier has less significance than a longer repetition of a single base station. Further, a short period of time may always have multiple base stations whose coverage areas overlap. Thus, such an indication of overlapping base station identifiers has less significance than multiple overlapping coverage areas of many base station identifiers. Thus, the analysis of the length of time associated with the base station identifiers within the log may be used to determine one or more stay sessions. In one embodiment, the significant place platform 103 determines both closed base station segments and closed base station segments that meet minimum requirements for threshold periods of time. Thus, in one embodiment, stay sessions may correspond to closed base station segments over a certain period of time in length.

In step 507, the significant place platform 103 causes, at least in part, a selection of the one or more base station identifiers to process in process 300 based, at least in part, on the one or more stay sessions. Thus, the significant place platform 103 may disregard base station identifiers that may be noise, such as base identifiers that communicate with a UE 101 while the UE 101 is moving and therefore do not represent a stay area that may correspond to a significant place. By processing the base station identifiers that correspond to stay sessions, the significant place platform 103 may lessen the processing load for determining significant places.

Figure 6:
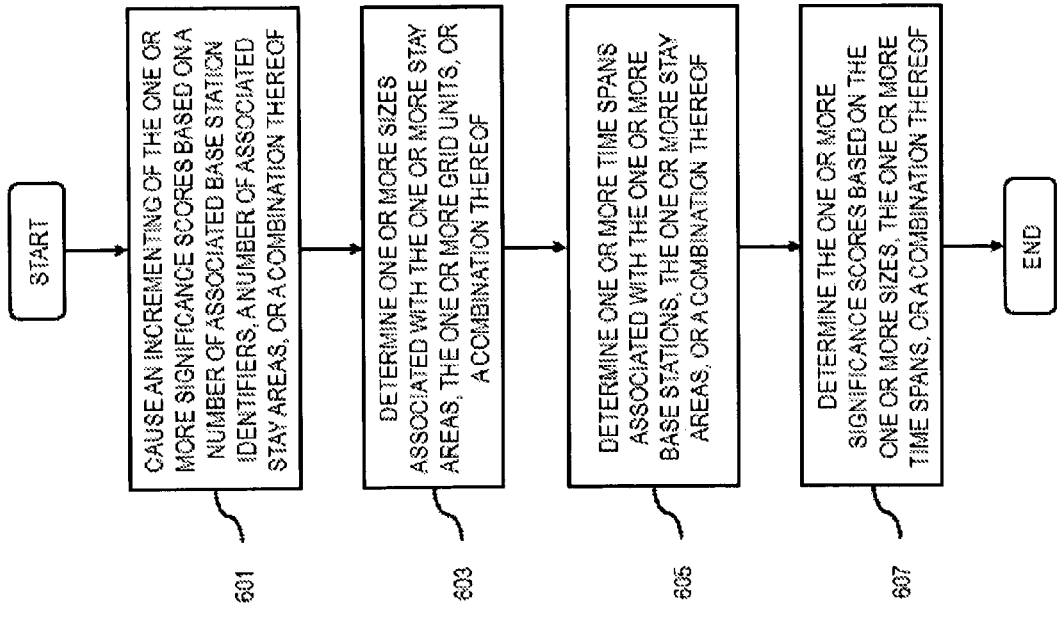
FIG. 6 is a flowchart of a process for determining one or more significance scores, according to one embodiment.

FIG. 6 is a flowchart of a process for determining one or more significance scores, according to one embodiment. In one embodiment, the significant place platform 103 performs the process 600 and is implemented in, for instance, a chip set including a processor and a memory as shown in FIG. 13. In step 601, the significant place platform 103 causes, at least in part, an incrementing of the one or more significance scores associated with the one or more grid units of process 300 based, at least in part, on a number of the one or more base station identifiers associated with the one or more grid units, a number of stay areas associated with the one or more grid units, or a combination thereof. In one embodiment, the significant place platform 103 associates the number of times a grid unit is part of a stay area with the significance score associated with the grid unit. Thus, the significance score associated with a grid unit is incremented, for example, one significance score unit when the grid unit is associated with a stay area. In one embodiment, the significant place platform 103 associates the number of times a grid unit is associated with a coverage area of a base station identifier that is included in the log of base station identifiers with the significance score associated with the grid unit. Thus, the significance score associated with a grid unit is incremented, for example, one significance score unit when a base station identifier associated with a coverage area that covers the grid unit is in the log of base station identifiers. In one embodiment, the significant place platform 103 may change the significance score associated with a grid unit according to both of the above methods.

In step 603, in one embodiment, the significant place platform 103 may determine one or more sizes associated with the one or more stay areas, the one or more grid units, or a combination thereof. In one embodiment, for a stay area, the significant place platform 103 determines the total number of grid units that are associated with the stay area. In one embodiment, the significant place platform 103 determines the size of the grid units that are associated with the stay area. In one embodiment, the significant place platform 103 determines both the total number of grid units that are, associated with the stay area and the sizes of the grid units.

In step 605, in one embodiment, the significant place platform 103 may determine one or more time spans associated with the one or more base stations, the one or more stay areas, or a combination thereof. In one embodiment, the log of base station identifiers includes timestamps for each time a base station identifier is logged within the log (e.g., each time the device registers with the base station). The significant place platform 103 may determine the length of time associated with each base station identifier from the time stamps and associate this length of time with the grid units that are included within the coverage area of the base stations. In one embodiment, the significant place platform 103 may determine the length of time associated with each stay area based on the lengths of time associated with the base station identifiers that comprise the stay areas. In one embodiment, the significant place platform 103 may determine both the time spans associated with the base station identifiers and the time spans associated with the stay areas.

In step 607, the significant place platform 103 may determine the one or more significance scores based, at least in part, on the one or more sizes, the one or more time spans, or a combination thereof. Thus, by way of example, if the number of grid units associated with a stay area is large, the significance placed on a grid unit being a part of the stay area may be less than if the number of grid units associated with a stay area is small because the size may indicate the determination of significance may be less. Likewise, if the size of a grid unit is large, the significance placed on the grid unit may be less than if the size of the grid unit was small because the size may indicate the determination of significance may be less. Similarly, if the time span associated with a stay area is short, the significance placed on a grid unit in the stay area may be less than if the time span associated with the stay area is long because a short time span may indicate that the area associated with the stay area may not be of important significance to the user. In one embodiment, the significant place platform 103 considers both the one or more sizes and the one or more time spans according to equation (1) above. Thus, grid units that are part of small stay areas with long time spans are given more weight than grid units that are part of large stay areas with short time spans.

Figure 7:
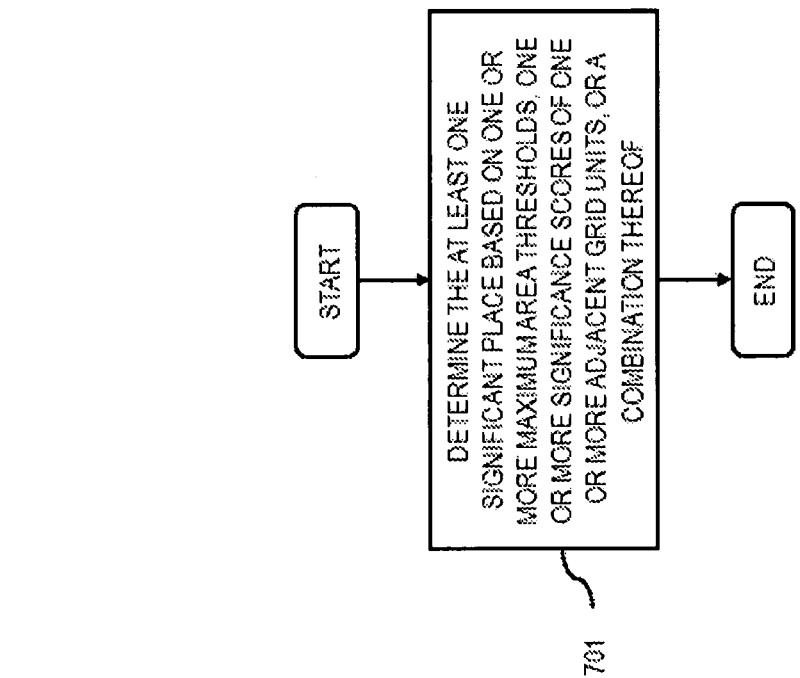
FIG. 7 is a flowchart of a process for determining at least one significant place based on a maximum area threshold and/or significance scores of one or more adjacent grid units, according to one embodiment.

FIG. 7 is a flowchart of a process for determining at least one significant place based on a maximum area threshold and/or significance scores of one or more adjacent grid units, according to one embodiment. In one embodiment, the significant place platform 103 performs the process 700 and is implemented in, for instance, a chip set including a processor and a memory as shown in FIG. 13. In step 701, the significant place platform 103 determines the at least one significant place based, at least in part, on one or more maximum area thresholds, one or more significance scores of one or more adjacent grid units, or a combination thereof. As discussed above, the significant place platform 103 may use one or more algorithms to narrow down the grid units that are associated with a stay area to determine a significant place. In one embodiment, the significant place platform 103 determines a maximum area threshold and recursively removes grid units from stay areas that have lower significance scores until the area associated with the stay areas is lower than the threshold maximum area. The significant place platform 103 may then determine that the remaining grid units within the remaining portions of the stay areas represent significant places for the user associated with the UE 101 from which the base station identifier logs originated. In one embodiment, the significant place platform 103 may recursively remove grid units from stay areas by first removing the outer grid units and subsequently removing grid units closer to the center of the stay area. Such an analysis may occur where, for example, the grid units associated with stay areas all have the same significance score such that a recursive pruning based on significance score may not be possible.

Figure 8:
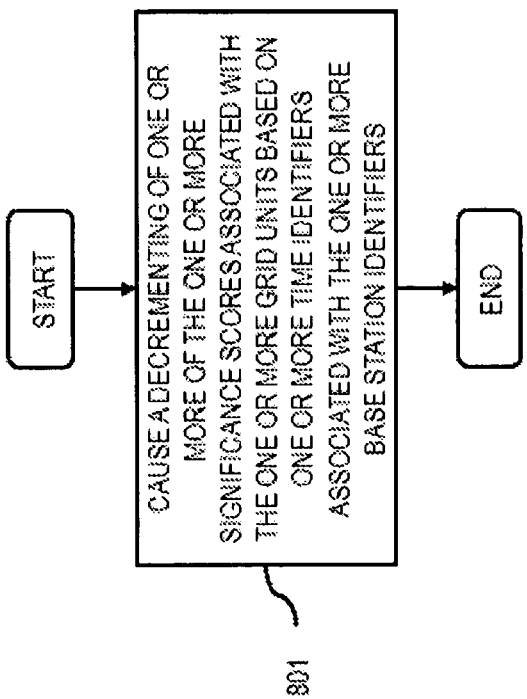
FIG. 8 is a flowchart of a process for decrementing significance scores, according to one embodiment.

FIG. 8 is a flowchart of a process for decrementing significance scores, according to one embodiment. In one embodiment, the significant place platform 103 performs the process 800 and is implemented in, for instance, a chip set including a processor and a memory as shown in FIG. 13. In step 801, the significant place platform 103 causes, at least in part, a decrementing of one or more of the one or more significance scores associated with the one or more grid units based, at least in part, on one or more time identifiers associated with the one or more base station identifiers. As discussed above, a significant place will generally be visited routinely over a period of time. Accordingly, a grid unit associated with a significant place will naturally have its significance score increase over time. If the user stops visiting the significant place, the significance score will become lower than other grid units that are visited. However, in one embodiment, the significant place platform 103 causes a decrementing of the significance scores associated with the grid units that are not within a stay area that has been recently visited. Thus, by way of example, if a grid unit has not been visited for at least one week, the significance score associated with the grid unit may be decremented by one unit. Further, for example, if a grid unit has not been visited for at least two weeks, the significance score associated with the grid unit may be decremented by two units, and so on until the significance score is zero or until the user again visits a significant place associated with the grid unit such that the grid unit is again associated with a stay area and/or a logged base station identifier. According to this approach, as the significant places associated with a user change, the significant place platform 103 will determine the change in the significant places. Thus, for instance, as the house a user lives in, which may correspond to a significant place, changes, the process 800 allows for the system 100 to follow the user's behavior as the significant places change to new significant places, such as a new house for the user. As the change occurs, the old significant places can be faded out and new significant places can be identified.

Figure 9:
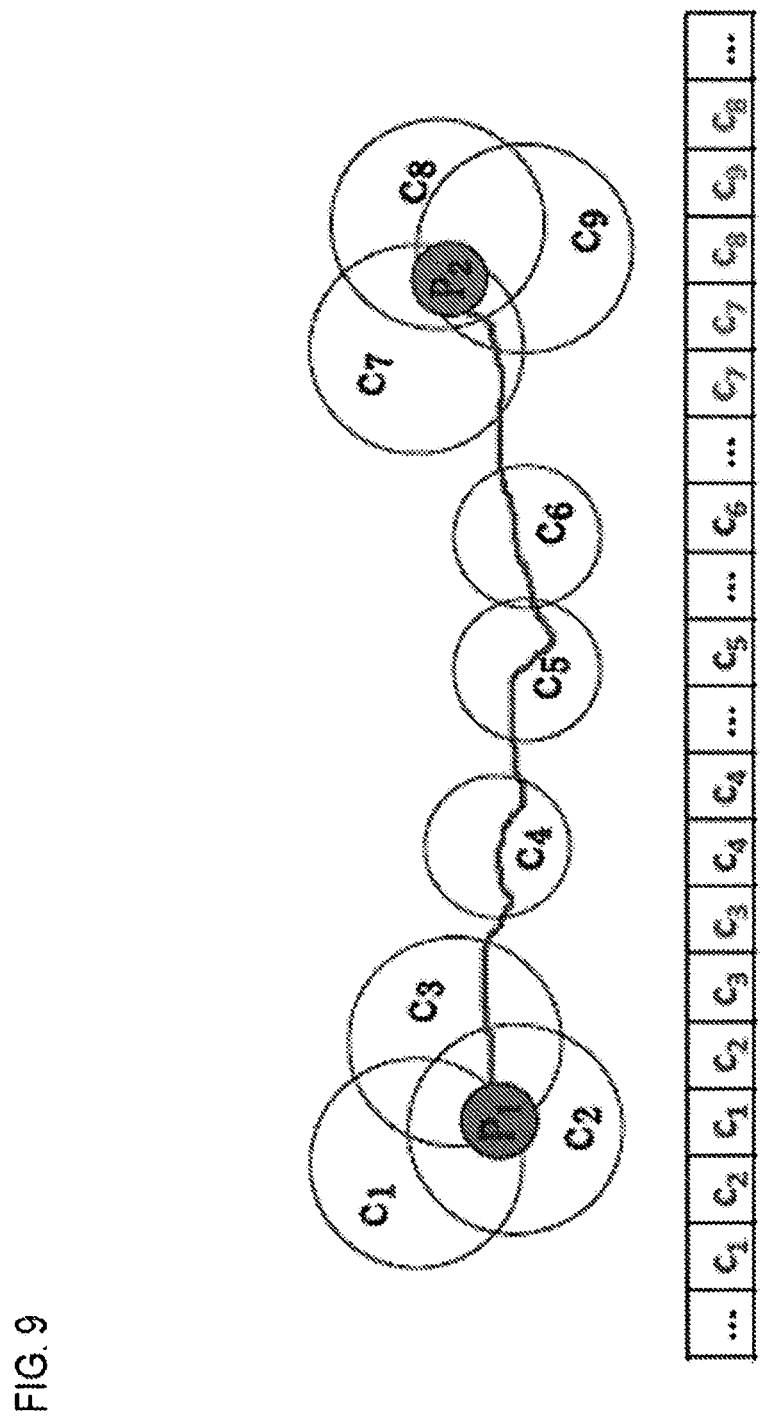
FIG. 9 is a diagram of an exemplary base station trajectory, according to one embodiment.

FIG. 9 is a diagram of an exemplary base station trajectory, according to one embodiment. As illustrated, a user associated with a UE 101 may start at point P1. While at point P1, the UE 101 may communicate with several base stations that are associated with several coverage areas (e.g., C1, C2 and C3). Additionally, the UE 101 may communicate with one base station more than the other base stations, or may communicate with the base stations equally. As illustrated in FIG. 9, the UE 101 communicated with all of the base stations represented by the coverage areas surrounding point P1 two times. Subsequently, the user may move from point P1 to point P2. While moving between point P1 and point P2, the UE 101 may communicate with several base stations that are associated with several coverage areas (e.g., C4, C5 and C6). Once at point P2, the UE 101 may communicate with several base stations that are associated with several coverage areas (e.g., C7, C8 and C9). As illustrated in FIG. 9, the UE 101 communicated with the base station associated with coverage areas C7 and C8 twice and once with the base station associated with coverage area C9 at point P2. Upon processing the base station trajectory illustrated in FIG. 9, the significant place platform 103 may determine the communication with base stations associated with coverage areas C1, C2 and C3 represent a stay session (e.g., a closed base station segment) and the coverage areas C7, C8 and C9 represent a stay session (e.g., a closed base station segment) because the coverage areas overlap. The base stations associated with coverage areas C4 and C5 may not represent part of the stays sessions because, for example, coverage area C4 does not overlap with the overlapping coverage areas C1, C2 and C3, and coverage area C6 does not overlap with the overlapping coverage areas C7, C8 and C9. Moreover, despite coverage areas C5 and C6 overlapping, the significant place platform 103 may determine that the overlapping coverage area does not represent a stay session or a stay area because the time associated with the base station identifiers that correspond to the coverage areas C5 and C6 is not longer than a set threshold period of time.

Figure 10:
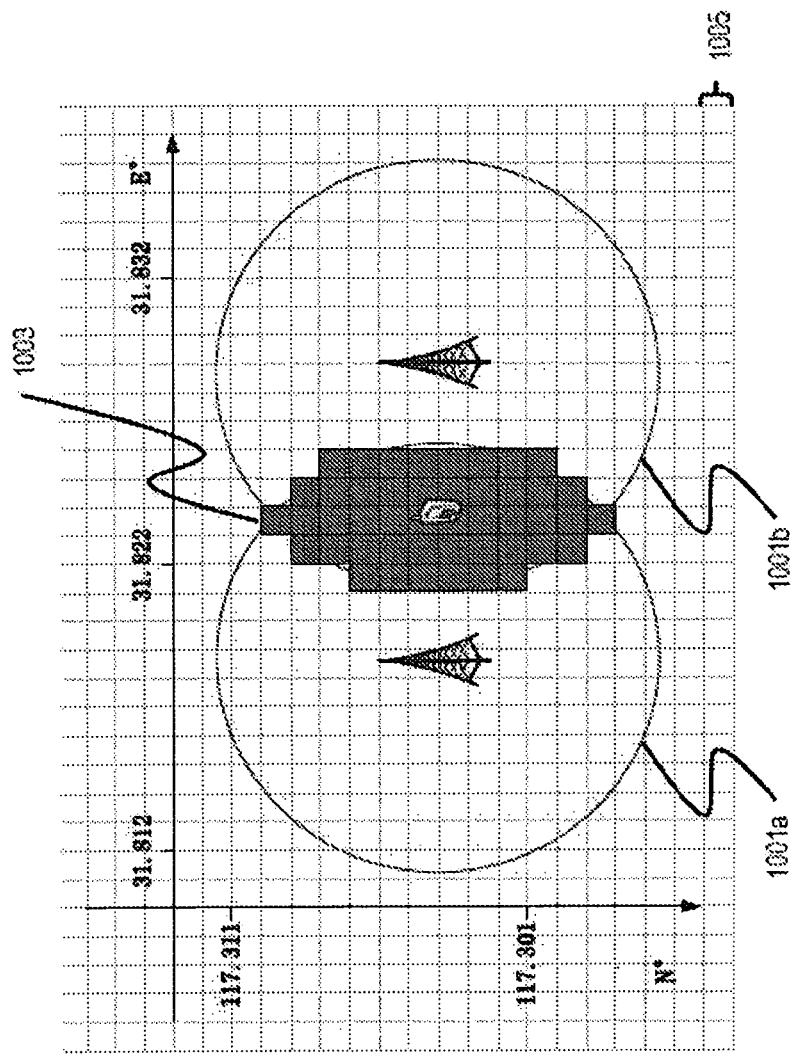
FIG. 10 is a diagram of an exemplary stay area, according to one embodiment.

FIG. 10 is a diagram of an exemplary stay area, according to one embodiment. As illustrated, there are two coverage areas 1001a and 1001b. The coverage areas 1001a and 1001b overlap forming an overlap area 1003. The significant place platform 103 may have determined the overlap area 1003 corresponds to a stay area because, for example, the user has stayed within an area where a UE 101 associated with the user has communicated with base stations associated with the coverage areas 1001a and 1001b long enough to consider it a stay session. As further illustrated, the coverage areas are mapped over a geographic area that is composed of many grid units 1005. Thus, the overlap area 1003 also includes multiple grid units (e.g., 46 grid units). The overlap area 1003 comprising the stay area may be processed along with other stay areas, which may include grid units that are also included with the overlap area 1003, to determine a significant place associated with the user within the illustrated geographic area based on the total stay areas and associated grid units.

Figure 11:
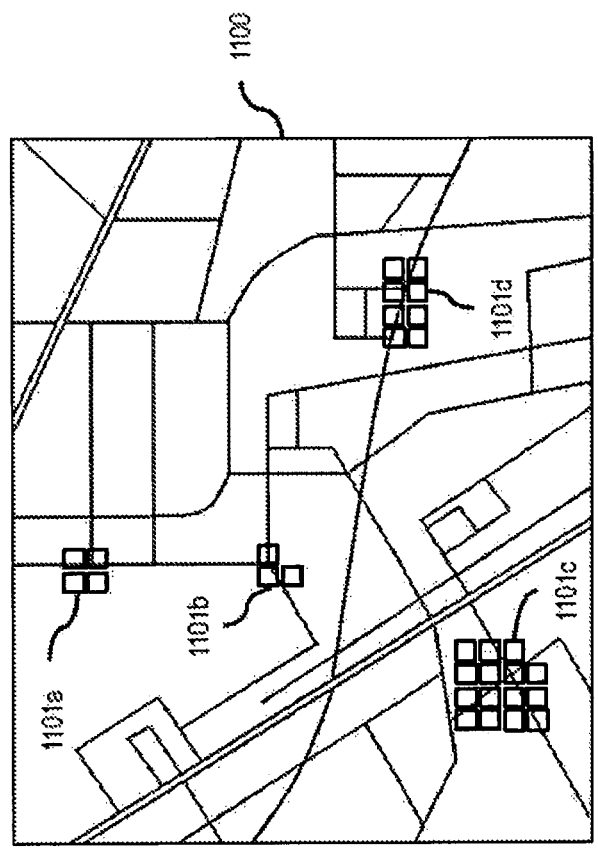
FIG. 11 is a diagram of an exemplary user interface utilized in the processes of FIGS. 3-8, according to one embodiment.

FIG. 11 is a diagram of an exemplary user interface 1100 utilized in the processes of FIGS. 3-8, according to one embodiment. The user interface 1100 may display several significant places 1101a-1101d (collectively referred to as significant places 1101) that the significant place platform 103 has determined based on the log of base station identifiers. As illustrated, the significant places 1101 are composed of many grid units that are the remaining grid units after the recursive pruning based on, for example, the maximum area threshold and grid units with lower significance scores. The significant place platform 103 may then transmit this information to, for example, one or more services 109 and/or content providers 113 such that one or more service providers may provide personalized information with respect to a user's significant places.

The processes described herein for determining significant places may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 12:
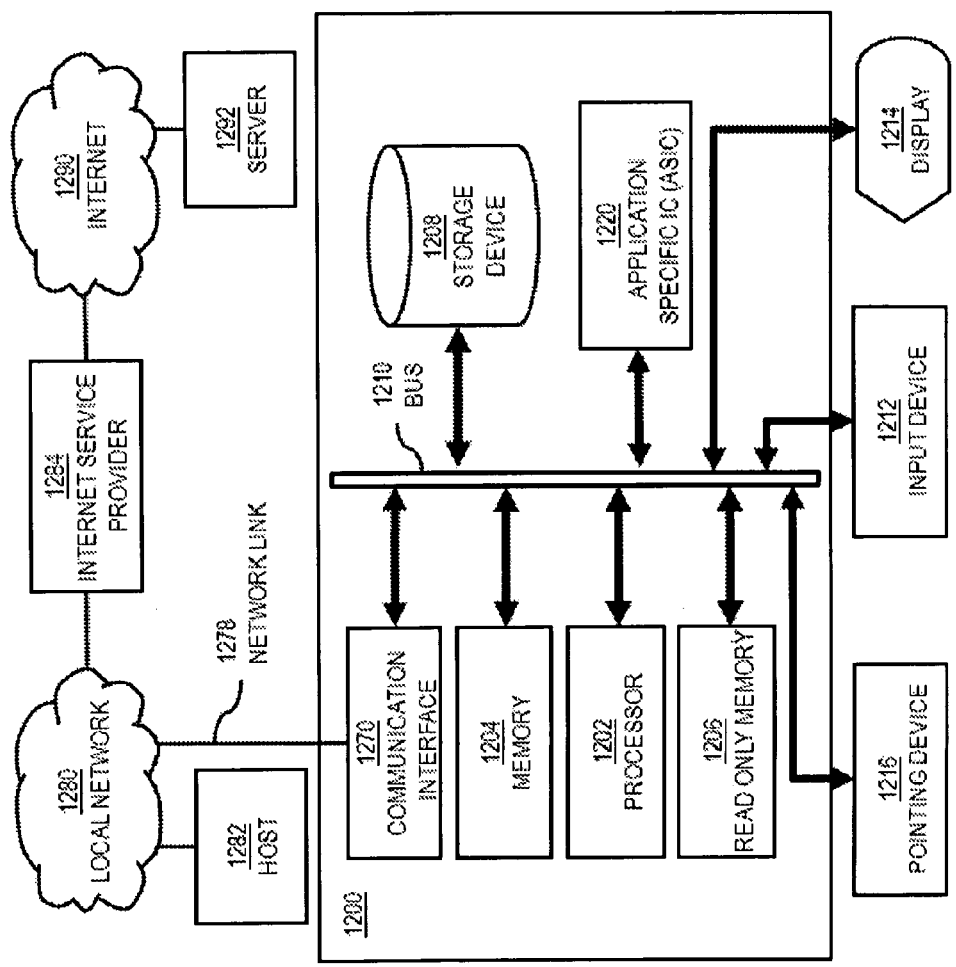
FIG. 12 is a diagram of hardware that can be used to implement an embodiment of the invention.

FIG. 12 illustrates a computer system 1200 upon which an embodiment of the invention may be implemented. Although computer system 1200 is depicted with respect to a particular device or equipment, it is contemplated that other devices or equipment (e.g., network elements, servers, etc.) within FIG. 12 can deploy the illustrated hardware and components of system 1200. Computer system 1200 is programmed (e.g., via computer program code or instructions) to determine significant places as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of determining significant places.

A bus 1210 includes one or more parallel conductors of information so that information is transferred quickly among devices coupled to the bus 1210. One or more processors 1202 for processing information are coupled with the bus 1210.

A processor (or multiple processors) 1202 performs a set of operations on information as specified by computer program code related to determining significant places. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or any other dynamic storage device, stores information including processor instructions for determining significant places. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or any other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for determining significant places, is provided to the bus 1210 for use by the processor from an external input device 1212, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT), a liquid crystal display (LCD), a light emitting diode (LED) display, an organic LED (OLED) display, a plasma screen, or a printer for presenting text or images, and a pointing device 1216, such as a mouse, a trackball, cursor direction keys, or a motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of ASICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210.

Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 105 for determining significant places associated with the UE 101.

The term "computer-readable medium" as used herein refers to any medium that participates in providing information to processor 1202, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1208. Volatile media include, for example, dynamic memory 1204. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system 1200 can be deployed in various configurations within other computer systems, e.g., host 1282 and server 1292.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or any other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

FIG. 13 illustrates a chip set or chip 1300 upon which an embodiment of the invention may be implemented. Chip set 1300 is programmed to determine significant places as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1300 can be implemented in a single chip. It is further contemplated that in certain embodiments the chip set or chip 1300 can be implemented as a single "system on a chip." It is further contemplated that in certain embodiments a separate ASIC would not be used, for example, and that all relevant functions as disclosed herein would be performed by a processor or processors. Chip set or chip 1300, or a portion thereof, constitutes a means for performing one or more steps of providing user interface navigation information associated with the availability of functions. Chip set or chip 1300, or a portion thereof, constitutes a means for performing one or more steps of determining significant places.

In one embodiment, the chip set or chip 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1300 includes merely one or more processors and some software and/or firmware supporting and/or relating to and/or for the one or more processors.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to determine significant places. The memory 1305 also stores the data associated with or generated by the execution of the inventive steps.

Figure 14:
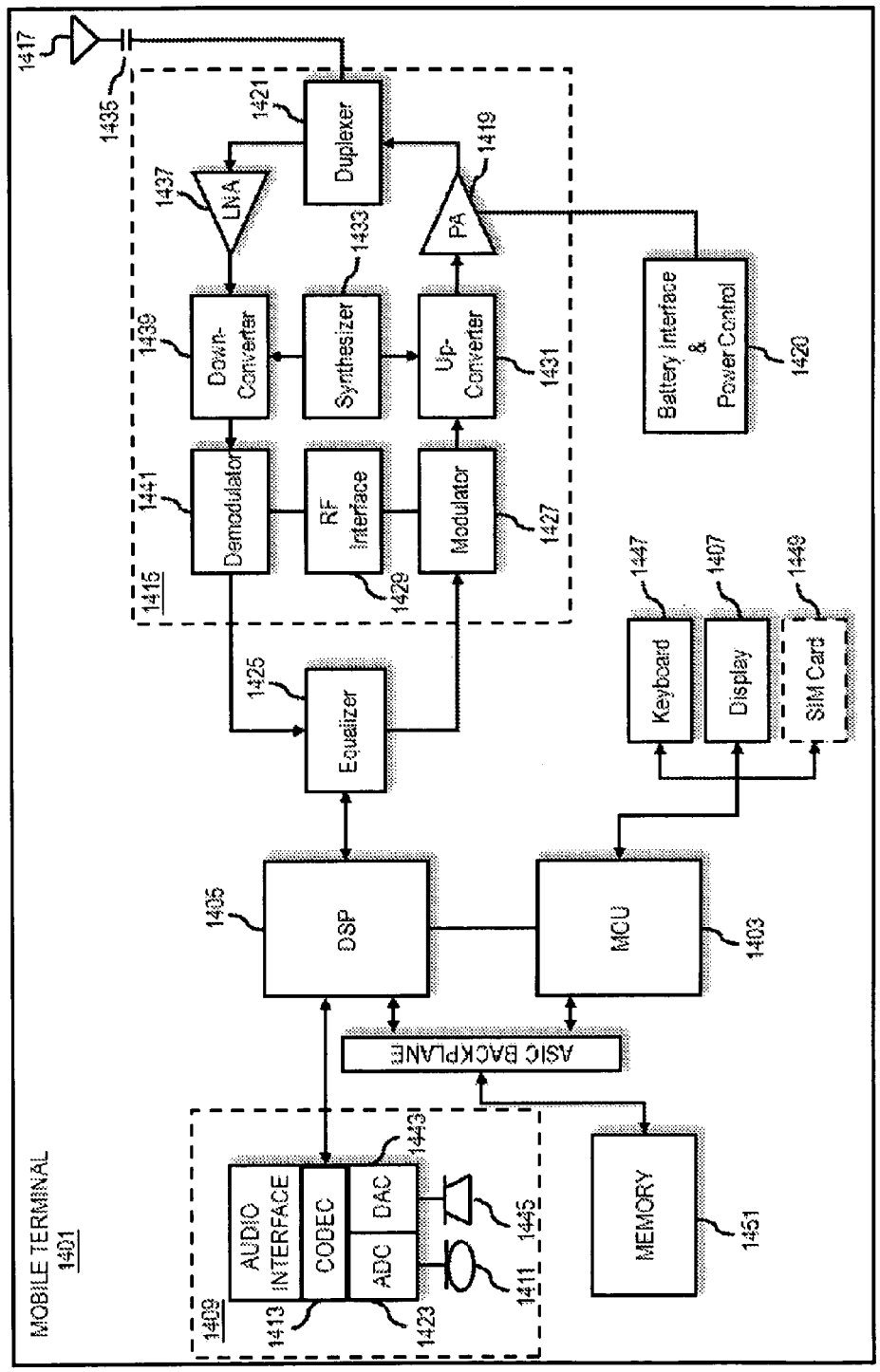
FIG. 14 is a diagram of a mobile terminal (e.g., handset) that can be used to implement an embodiment of the invention.

FIG. 14 is a diagram of exemplary components of a mobile terminal (e.g., handset) for communications, which is capable of operating in the system of FIG. 1, according to one embodiment. In some embodiments, mobile terminal 1401, or a portion thereof, constitutes a means for performing one or more steps of determining significant places. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of determining significant places. The display 1407 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403 which can be implemented as a Central Processing Unit (CPU).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to determine significant places. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   mapping one or more communication coverage areas associated with one or more identifiers onto at least one geo-grid, wherein the one or more identifiers are associated with at least one device operating within at least one communication network;
   processing the one or more identifiers to determine one or more significance scores associated with one or more grid units of the at least one geo-grid;
   determining at least one significant place based, at least in part, on the one or more significance scores;
   processing the one or more identifiers, one or more overlaps of one or more communication coverage areas associated with the one or more communication coverage areas, or a combination thereof of to determine one or more stay areas; and
   selecting the one or more identifiers to process based, at least in part, on the one or more stay areas.

2. A method of claim 1, further comprising:
   processing one or more time spans associated with the one or more identifiers to determine, at least in part, one or more stay sessions; and
   selecting the one or more identifiers to process based, at least in part, on the one or more stay sessions.

3. A method of claim 2, further comprising:
   processing the one or more identifiers to determine one or more closed segments; and
   determining the one or more stays sessions based, at least in part, on the one or more closed segments.

4. A method of claim 1, further comprising:
   incrementing the one or more significance scores associated with the one or more grid units based, at least in part, on a number of the one or more identifiers associated with the one or more grid units, a number of stay areas associated with the one or more grid units, or a combination thereof.

5. A method of claim 1, further comprising:
   determining one or more sizes associated with the one or more stay areas, the one or more grid units, or a combination thereof; and
   determining the one or more significance scores based, at least in part, on the one or more sizes.

6. A method of claim 5, wherein a significance score is negatively related to a size of the one or more stay areas.

7. A method of claim 1, further comprising:
determining one or more time spans associated with the one or more identifiers, the one or more stay areas, or a combination thereof; and
determining the one or more significance scores based, at least in part, on the one or more time spans.

8. A method further comprising:
mapping one or more communication coverage areas associated with one or more identifiers onto at least one geo-grid, wherein the one or more identifiers are associated with at least one device operating within at least one communication network;
processing the one or more identifiers to determine one or more significance scores associated with one or more grid units of the at least one geo-grid;
determining at least one significant place based, at least in part, on the one or more significance scores; and
determining the at least one significant place based, at least in part, on one or more maximum area thresholds, one or more significance scores of one or more adjacent grid units, or a combination thereof.

9. A method further comprising:
mapping one or more communication coverage areas associated with one or more identifiers onto at least one geo-grid, wherein the one or more identifiers are associated with at least one device operating within at least one communication network;
processing the one or more identifiers to determine one or more significance scores associated with one or more grid units of the at least one geo-grid;
determining at least one significant place based, at least in part, on the one or more significance scores; and
decrementing one or more of the one or more significance scores associated with the one or more grid units based, at least in part, on one or more time identifiers associated with the one or more identifiers.

10. An apparatus comprising:
at least one processor; and
at least one memory including computer program code for one or more programs,
the at least one memory and the computer program code configured to, with the at least one processor, cause the apparatus to perform at least the following,
cause, at least in part, a mapping of one or more communication coverage areas associated with one or more identifiers onto at least one geo-grid, wherein the one or more identifiers are associated with at least one device operating within at least one communication network;
process the one or more identifiers to determine one or more significance scores associated with one or more grid units of the at least one geo-grid;
determine at least one significant place based, at least in part, on the one or more significance scores;
process the one or more identifiers, one or more overlaps of one or more communication coverage areas associated with the one or more communication coverage areas, or a combination thereof of to determine one or more stay areas; and
cause, at least in part, a selection of the one or more identifiers to process based, at least in part, on the one or more stay areas.

11. An apparatus of claim 10, wherein the apparatus is further caused to:
process one or more time spans associated with the one or more identifiers to determine, at least in part, one or more stay sessions; and
cause, at least in part, a selection of the one or more identifiers to process based, at least in part, on the one or more stay sessions.

12. An apparatus of claim 11, wherein the apparatus is further caused to:
process the one or more identifiers to determine one or more closed segments; and
determine the one or more stays sessions based, at least in part, on the one or more closed segments.

13. An apparatus of claim 10, wherein the apparatus is further caused to:
cause, at least in part, an incrementing of the one or more significance scores associated with the one or more grid units based, at least in part, on a number of the one or more identifiers associated with the one or more grid units, a number of stay areas associated with the one or more grid units, or a combination thereof.

14. An apparatus of claim 10, wherein the apparatus is further caused to:
determine one or more sizes associated with the one or more stay areas, the one or more grid units, or a combination thereof; and
determine the one or more significance scores based, at least in part, on the one or more sizes.

15. An apparatus of claim 14, wherein a significance score is negatively related to a size of the one or more stay areas.

16. An apparatus of claim 10, wherein the apparatus is further caused to:
determine one or more time spans associated with the one or more identifiers, the one or more stay areas, or a combination thereof; and
determine the one or more significance scores based, at least in part, on the one or more time spans.

17. An apparatus comprising:
at least one processor; and
at least one memory including computer program code for one or more programs,
the at least one memory and the computer program code configured to, with the at least one processor, cause the apparatus to perform at least the following,
cause, at least in part, a mapping of one or more communication coverage areas associated with one or more identifiers onto at least one geo-grid, wherein the one or more identifiers are associated with at least one device operating within at least one communication network;
process the one or more identifiers to determine one or more significance scores associated with one or more grid units of the at least one geo-grid;
determine at least one significant place based, at least in part, on the one or more significance scores; and
determine the at least one significant place based, at least in part, on one or more maximum area thresholds, one or more significance scores of one or more adjacent grid units, or a combination thereof.

18. An apparatus comprising:
at least one processor; and
at least one memory including computer program code for one or more programs,
the at least one memory and the computer program code configured to, with the at least one processor, cause the apparatus to perform at least the following,
cause, at least in part, a mapping of one or more communication coverage areas associated with one or more identifiers onto at least one geo-grid, wherein the one or more identifiers are associated with at least one device operating within at least one communication network;

process the one or more identifiers to determine one or more significance scores associated with one or more grid units of the at least one geo-grid;

determine at least one significant place based, at least in part, on the one or more significance scores; and cause, at least in part, a decrementing of one or more of the one or more significance scores associated with the one or more grid units based, at least in part, on one or more time identifiers associated with the one or more identifiers.

19. A non-transitory computer-readable storage medium carrying one or more sequences of one or more instructions which, when executed by one or more processors, cause an apparatus to at least perform the steps of:

causing, at least in part, a mapping of one or more communication coverage areas associated with one or more identifiers onto at least one geo-grid, wherein the one or more identifiers are associated with at least one device operating within at least one communication network;

processing the one or more identifiers to determine one or more significance scores associated with one or more grid units of the at least one geo-grid;

determining at least one significant place based, at least in part, on the one or more significance scores;

processing the one or more identifiers, one or more overlaps of one or more communication coverage areas associated with the one or more communication coverage areas, or a combination thereof of to determine one or more stay areas; and causing, at least in part, a selection of the one or more identifiers to process based, at least in part, on the one or more stay areas.

* * * * *